United States Patent [19]

Janusch

[11] 4,339,306

[45] Jul. 13, 1982

[54] APPARATUS FOR DRYING ORGANIC MATERIAL, PARTICULARLY BROWN COAL

[75] Inventor: Alois Janusch, Leoben-Seegraben, Austria

[73] Assignee: Voest-Alpine Aktiengesellschaft, Vienna, Austria

[21] Appl. No.: 196,768

[22] Filed: Oct. 14, 1980

[30] Foreign Application Priority Data

Oct. 15, 1979 [AT] Austria ................................ 6712/79

[51] Int. Cl.[3] ............................................ B01D 1/14

[52] U.S. Cl. .................................. 159/15; 159/16 S; 210/336; 34/171

[58] Field of Search ................ 159/15, 16 S; 210/335, 210/336; 34/171, 178

[56] References Cited

U.S. PATENT DOCUMENTS

| | | | |
|---|---|---|---|
| 2,041,059 | 5/1936 | French | 159/15 |
| 2,178,750 | 11/1939 | Garland | 34/171 |
| 3,058,235 | 10/1962 | Morris et al. | 34/171 |
| 3,199,215 | 8/1965 | Jesse et al. | 34/171 |

*Primary Examiner*—Norman Yudkoff

*Attorney, Agent, or Firm*—Cushman, Darby & Cushman

[57] ABSTRACT

The apparatus for drying organic materials such as for example brown coal has a space (5) maintained under a pressure exceeding atmospheric pressure, the material to be dried being supplied to the upper end (12) of said space and the dried material being discharged from the lower end (20) of said space. Between the supply opening (12) and the discharge opening (20) there are provided obliquely arranged sieves (2, 6) and water-impermeable collecting spaces for the water separated on the sieves. The collecting spaces (3, 7) for the water separated on the sieves are connected with drain channels (9, 10), and several sieves (2, 6) are arranged one above the other in the manner of cascades, the lower edge of one sieve being located above an uppermost area of the following sieve (2, 6) as seen in flow direction (FIG. 1).

18 Claims, 3 Drawing Figures

APPARATUS FOR DRYING ORGANIC MATERIAL, PARTICULARLY BROWN COAL

The present invention refers to an apparatus for drying organic material, particularly brown coal. Brown coal frequently has a very high water content and is for this reason only poorly suitable as fuel or for further processing in its original form. There are known drying processes by which the brown coal is treated with hot water and/or steam under high pressure, thus reducing the water content of organic material. The water is subsequently separated from the dried material. It is also known to continuously perform such a process. The known apparatuses for drying organic materials in an autoclave give, however, no satisfying effect.

The invention particularly refers to an apparatus for drying organic materials, particularly brown coals, by means of steam and/or hot water, comprising a space maintained under a pressure exceeding atmospheric pressure, through which space the organic materials are, preferably continuously, fed in form of a sludge or suspension and in which space the organic materials are at least partially separated from the water. It is an object of the invention to improve such an apparatus and the invention essentially consists in that at the upper end of the space maintained under a pressure exceeding atmospheric pressure at least one supply opening is provided and that at the lower end of said space at least one discharge opening for solid material is provided and in that between said supply opening and said discharge opening sieves are obliquely arranged which are roofing chambers delimited by water-impermeable walls and having drain channels connected thereto and in that further a plurality of sieves is arranged in the manner of cascades one above the other, the bottom edges of the sieves being located above the most elevated area of the sieve arranged immediately below each sieve considered. By arranging the sieves one above the other in the manner of cascades, the drying effect is substantially increased. The water is passing through the sieves into the chambers defined by water-impermeable walls and roofed by the sieves and is discharged from these chambers via the drain channels. The organic solid matter is sliding on the obliquely arranged sieves and in view of the bottom edges of these sieves being located above the most elevated area of a sieve located at a lower level, the solid matter is sliding on these sieves till the bottom edge thereof and is reaching the sieve located at the next lower level. In the first stage of the sieve cascade, a sludge enriched in solid material is, as a rule, present on the sieves and the water removal becomes more and more effective from stage to stage of the cascade because the generated steam atmosphere can come into a more intimate contact with the solid material. In this manner, the water content of the organic solid material is step-wisely reduced until solid material dried to a substantial extent is present in the lowermost stage and subsequently discharged through the discharge opening.

According to a preferred embodiment of the invention, the sieves are formed of slot sieves, the slots of which extend in transverse direction, preferably perpendicularly relative to the sieve inclination. Such slot sieves have proved to be particularly effective.

According to the invention, the sieves can be declined relative to the horizontal direction for an angle up to 45°. Conveniently, the inclination of the uppermost sieve is greater than the inclination of the lowermost sieve with respect to the horizontal, the inclination of the sieves relative to the horizontal preferably decreasing from stage to stage seen in downward direction. The smaller is the inclination of the sieve the longer resides the material to be dried on the sieve. In the uppermost stage of the cascade the amount of water present in the sludge is the greatest. In the next stage of the cascade, the water content of the material to be dried is still further reduced and in view of the inclination of the sieves becoming smaller, the material to be dried is exposed to the steam atmosphere for a longer time interval.

According to the invention, the arrangement is conveniently such that in downward direction sieves being inclined in different directions are mutually alternating. This provides the possibility to give the space maintained under a pressure exceeding atmospheric pressure or the autoclave, respectively, a smaller breadth, because the material to be dried is alternately running on the sieves from one side to the other side. In this case and according to the invention, sieves arranged like a roof can alternate with sieves arranged in V-shape as seen in downward direction. It is also possible to alternately arrange pyramidally arranged sieves and hollow-pyramidally arranged sieves, noting that these pyramids may have a triangular, quadrangular or multiangular base. Finally, also conical sieves can alternate with hollow-conical sieves, but a pyramidal shape is more simple and more favourable in production, because the sieve surfaces can be plane surfaces.

According to the invention the arrangement is conveniently such that a steam supply conduit is, preferably with interposition of a distributor, opening into the chamber located below the lowermost sieve. In this manner, steam is introduced into the lower portion of the space containing the sieves and is flowing in upward direction for heating the solid material to be dried. The steam is flowing in countercurrent to the material to be dried and in upward direction so that partially dried solid material is subjected to a more intense heating than solid material having a still greater water content. According to a preferred embodiment of the invention the arrangement is such that the water-impermeable walls limiting the chambers roofed by the sieves are approximately parallelly arranged to and at a distance from the sieves following immediately below. Thus, the steam is forced to pass over the solid material sliding downwardly on the sieves, so that this solid material is intensely heated by the steam. When manufacturing these walls of a material having a poor heat conductivity, any additional heating of the expelled water is avoided.

The solid material is discharged via the discharge opening in a substantially dry condition. If the solid material has not been dried to the desired extent a conveyor means can, according to the invention, be adjoined to the discharge opening which extends to a subsequent drying stage.

According to the invention, the uppermost sieve can be V-shaped, have the shape of a hollow pyramid or the shape of a cone, noting that a distributor plate is arranged below the supply opening and has its edges, as seen in a top plan view, located within the outline of the uppermost sieve. This provides a good distribution of the material to be dried. The apparatus is charged from the very beginning at the highest area of the uppermost sieve, thus providing the possibility to fully use the sieve surface of this uppermost sieve.

According to the invention, the channels connected to the chambers roofed by the sieves are connected to a collecting conduit which, if desired with interposition of a water separator, is leading to a drying stage additionally provided and being arranged as a pre-drying stage or a post-drying stage. Water as well as steam is entering with a high temperature the chambers roofed by the sieve and the heat content of this medium can, in this manner, be made use of in an additional drying stage. Fine grains of the lignitic material are also contained in this water and when supplying this water containing fine-grained material into a subsequent drying stage also this fine-grained material can be made use of. Within the water separator, the water portion not containing organic material can be separated from the portion containing organic materials and can be discharged so that any excess water is removed. When drying the organic material, $CO_2$ is generated and for this reason and according to the invention, a lock for discharging $CO_2$ can be connected to the lower portion of the space comprising the sieves and maintained under a pressure exceeding atmospheric pressure.

The invention is further illustrated with reference to the drawing schematically showing an embodiment of an apparatus for drying brown coal.

In the drawing

Figure 1:
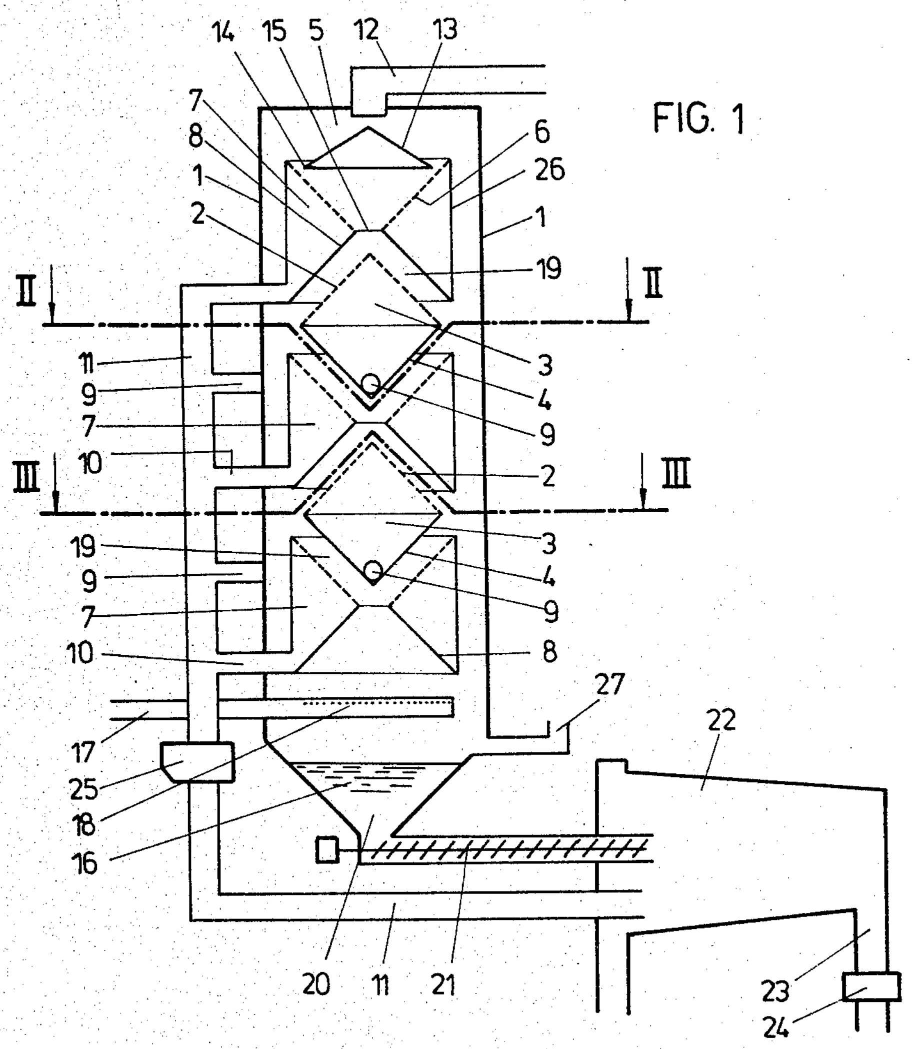
FIG. 1 shows an axial section of a pressurized container or autoclave, respectively, containing sieves arranged in cascade.
Figure 2:
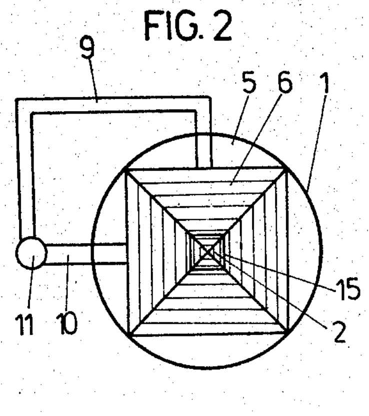
FIG. 2 shows a section along line II—II of FIG. 1.
Figure 3:
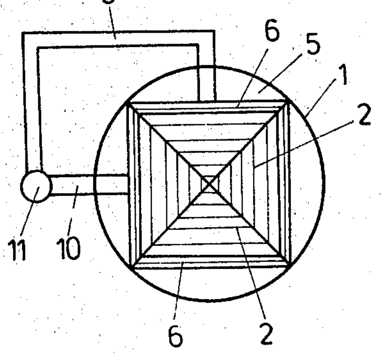
FIG. 3 shows a section along line III—III of FIG. 1.

In the drawing, 1 is the wall of a space 5, for an example an autoclave, maintained under super-atmospheric pressure. Within this space 5, pyramidally shaped sieves 2 are arranged which are roofing chambers 3 limited by water-impermeable and heat-insulating walls 4. There are further provided within this space 5 sieves 6 having the shape of hollow pyramids and roofing chambers 7 limited by water-impermeable and heat-insulating walls 8 and 26. Drain channels 9 are connected to the chambers 3 and drain channels 10 are connected to the chambers 7. These drain channels 9 and 10 are leading to a collecting conduit 11. In direction of the height of the apparatus, sieves 6 having the shape of hollow pyramids and sieves 2 having the shape of pyramids are alternating in downward direction. The sieves 6 and 2 are designed as slot sieves having their slots horizontally arranged.

A sludge or suspension of brown coal in water is introduced into the space 5 via a conduit 12. The brown coal may, for example, have a grain size up to 20 mm. This sludge or suspension is reaching a distributor plate 13 equally having the shape of a pyramid. The uppermost sieve is a sieve 6 having the shape of a hollow pyramid and the margin 14 of this distributor plate 13 is, as seen in a top plan view, located within the outline or outer edge of the uppermost sieve 6, so that the sludge or suspension supplied is reaching the upper area of the sieve 6. The sludge is sliding down on the sieve 6 and is reaching the subsequent sieve 2 of pyramidal shape via a central opening 15 of the sieve 6. The material sliding off said sieve 2 is, now again, reaching the upper portion of the subsequent sieve 6 having the shape of a hollow pyramid, and so on. The water flows through the slots of the sieves into the chambers 7 and 3, respectively, being roofed by the mentioned sieves. The water is drained out of these chambers through the drain channels 9 and 10 into the collecting conduit 11. In this manner, the material is step-wisely dried and the dried brown coal is then falling into the lowermost portion 16 of the space 5 maintained under super-atmospheric pressure (a pressure exceeding atmospheric pressure).

A steam conduit 17 is opening into the lower portion of the space via a distributor 18. The steam flows in upward direction and is heating the brown coal present on the sieves 2 and 6. The water-impermeable walls 4 and 8 are parallely arranged to and at a distance from the sieves 6 and 2. Thus, channels 19 are formed through which steam flows in upward direction and the steam is in this manner, maintained in contact with the brown coal located on the sieves 2 and 6.

A discharge opening 20 for dried brown coal is arranged at the lower end of the space 5 and a conveyor means 21 for conveying the brown coal to a subsequent drying stage 22 (shown as centrifuge) is connected to said discharge opening. The more thoroughly dried brown coal is then discharged from said drying stage 22 via a conduit 23 and a pressure lock 24.

The collecting conduit 11 extends till drying stage 22, so that the heat content of the discharge medium and also the portion of fine-grained brown coal contained therein can be made use of. A water separator 25 is interconnected into the collecting conduit 11. 27 designates the lock for discharging the $CO_2$ generated on drying of lignitic brown coal. Slot sieves having slots of a width within the range of 0.2 to 0.5 mm have proved of particular advantage.

What is claimed is:

1. Apparatus for drying organic materials, particularly brown coal, by means of steam and of hot water, comprising a space maintained under a pressure exceeding atmospheric pressure, through which space the organic materials are fed in form of a sludge or suspension and in which space the organic materials are at least partially separated from the water, characterized in that at the upper end of the space maintained under a pressure exceeding atmospheric pressure at least one supply opening is provided, that at the lower end of said space at least one discharge opening for solid materials is provided, that a steam supply line opens into the lower end of said space and in that between said supply opening and said discharge opening sieves are obliquely arranged which are roofing chambers limited by water-impermeable walls and having drain channels connected thereto and in that further a plurality of sieves is arranged in the manner of cascades one above the other, the bottom edges of the sieves being located above the most elevated area of the sieve arranged immediately below each sieve considered.

2. Apparatus as claimed in claim 1, characterized in that the sieves are slot sieves having their slots transversely extending, preferably normally extending relative to the inclination of the sieve.

3. Apparatus as claimed in claim 1 or 2, characterized in that the sieves are inclined relative to a horizontal line for an angle up to 45°.

4. Apparatus as claimed in claim 2, characterized in that width of the slots of the slot sieves is 0.2 to 0.5 mm.

5. Apparatus as claimed in claim 1, characterized in that the inclination of the uppermost sieve is, with respect to a horizontal line, greater than the inclination of the lowermost sieve, the inclination of the sieves relative to a horizontal line preferably decreasing from stage to stage seen in downward direction.

6. Apparatus as claimed in claim 1, characterized in that, as seen in downward direction, sieves being inclined in different directions are mutually alternating.

7. Apparatus as claimed in claim 1, characterized in that, as seen in downward direction, sieves arranged like a roof are alternating with sieves arranged in V-shape.

8. Apparatus as claimed in claim 1, characterized in that, as seen in downward direction, pyramidally arranged sieves are alternating with hollow-pyramidally arranged sieves.

9. Apparatus as claimed in claim 1, characterized in that, as seen in downward direction, conical sieves are alternating with hollow-conical sieves.

10. Apparatus as claimed in claim 1, characterized in that the water-impermeable walls limiting the chambers roofed by the sieves are, at least partially, approximately parallely arranged to and at a distance from the sieve following immediately below.

11. Apparatus as claimed in claim 1, characterized in that a conveying means leading to a subsequent drying stage is connected to the discharge opening.

12. Apparatus as claimed in claim 1, characterized in that the uppermost sieve is V-shaped or has the shape of a hollow pyramid or has the shape of a cone and in that a distributor plate is arranged below the supply opening and has its margin, as seen in a top plan view, within the outline of the uppermost sieve.

13. Apparatus as claimed in claim 1, characterized in that the drain channels connected to the chambers roofed by the sieves are connected to a collecting conduit which, if desired with interposition of a water separator, is leading to an additional pre-drying stage or post-drying stage.

14. Apparatus as claimed in claim 1, characterized in that a lock for discharging $CO_2$ is connected to the lower portion of the space containing the sieves and maintained under a pressure exceeding atmospheric pressure.

15. Apparatus as in claim 1 wherein said water-impermeable walls are heat-insulating.

16. Apparatus for drying a suspension of particulate organic solid material comprising: a vessel having an upper end and a lower end; means including a steam inlet conduit opening into the lower end of the vessel for maintaining the interior of the vessel at superatmospheric pressure; means for supplying a water suspension of particulate organic solid material into the upper end of the vessel; means for discharging solid material from the lower end of the vessel; a cascade of inclined sieves within said vessel between the upper and lower ends thereof, said sieves being arranged one above the other such that solid material sliding from the lower end of one sieve falls onto the upper end of the next lower sieve; there being a water impermeable wall and a drain channel disposed below each sieve for removing water which passes downwardly through the respective sieve.

17. Apparatus as in claim 16 wherein the arrangement of sieves and water-impermeable walls is such that steam introduced through the steam inlet conduit passes upwardly through a space between each sieve and the adjacent sieve but does not pass upwardly through the sieves.

18. Apparatus as in claim 17 wherein the sieves and water-impermeable walls are generally V-shaped in vertical cross-section and wherein upwardly tapering sieves alternate with downwardly tapering sieves, the imperforate wall between each upwardly tapering sieve and the adjacent lower downwardly tapering sieve being downwardly tapered and the imperforate wall between each upwardly tapering sieve and the adjacent upper downwardly tapering sieve being upwardly tapered, each of said imperforate walls preventing flow of steam upwardly through the sieve which is located adjacent and above the respective imperforate wall.

* * * * *